May 20, 1941.   F. G. STEINER ET AL   2,242,552
STOP MECHANISM FOR DISPENSING CABINETS
Original Filed May 24, 1939   2 Sheets-Sheet 1
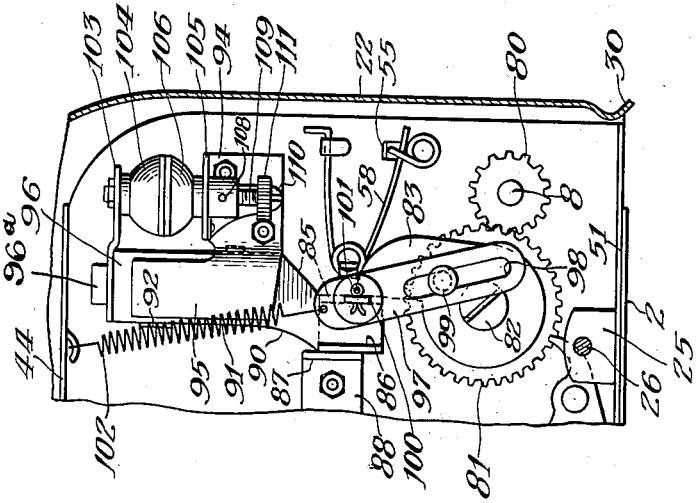
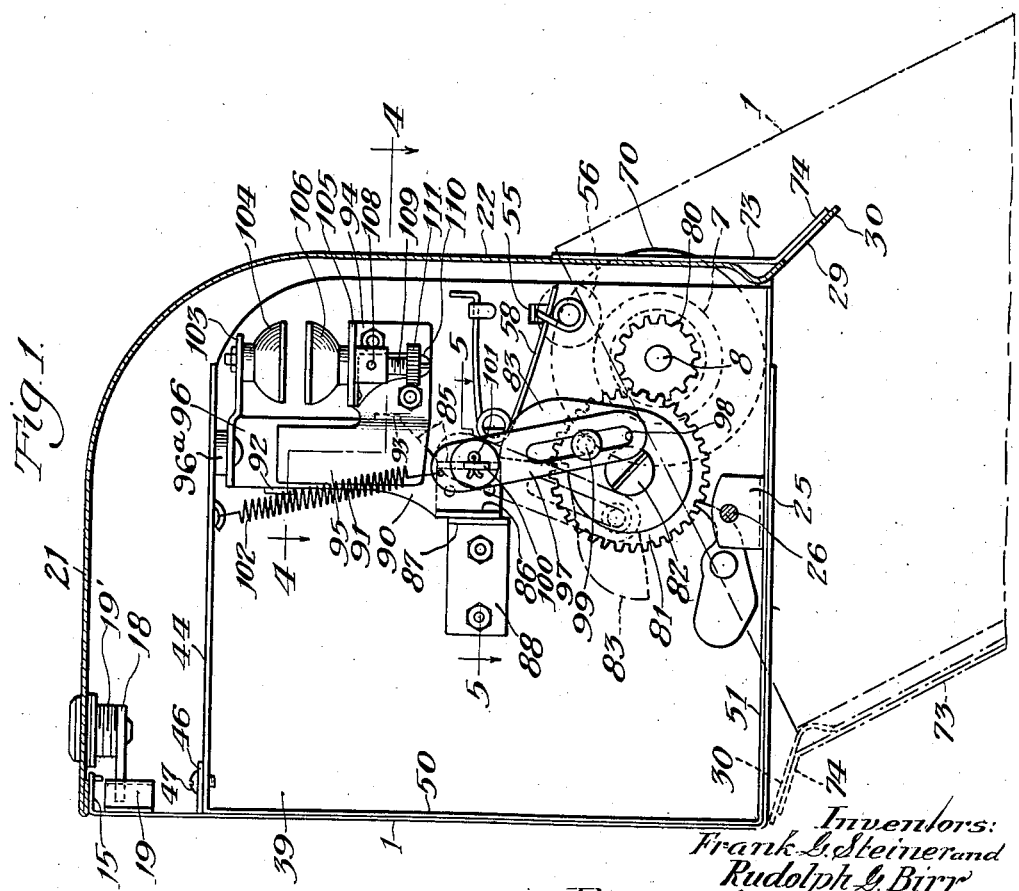
Inventors:
Frank G. Steiner and
Rudolph G. Birr
By: Harold Olsen
Attorney.

May 20, 1941. F. G. STEINER ET AL 2,242,552
STOP MECHANISM FOR DISPENSING CABINETS
Original Filed May 24, 1939   2 Sheets-Sheet 2
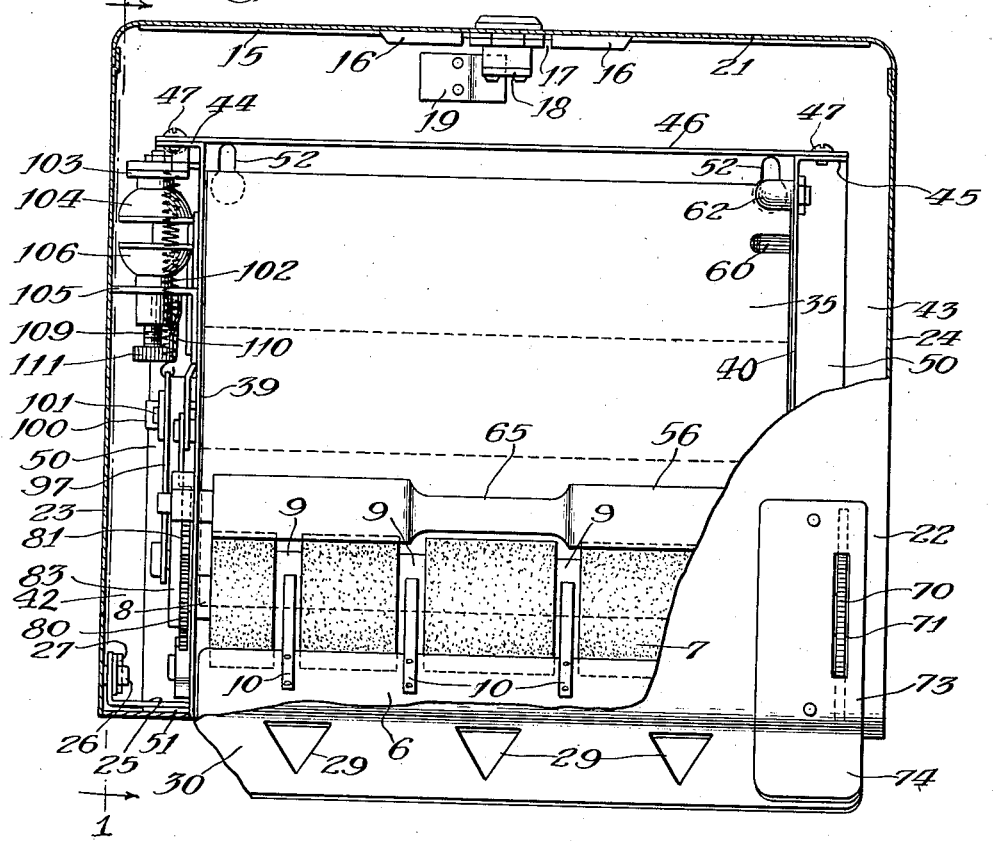
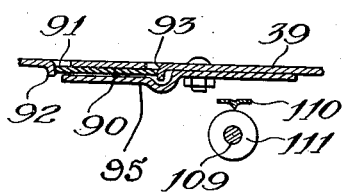
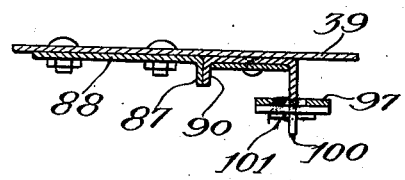
Inventors:
Frank G. Steiner and
Rudolph G. Birr
By Harold Olsen
Attorney Patented May 20, 1941

2,242,552

UNITED STATES PATENT OFFICE 2,242,552

STOP MECHANISM FOR DISPENSING CABINETS

Frank G. Steiner, Miami Beach, Fla., and Rudolph G. Birr, Lombard, Ill., assignors to Steiner Sales Company, Salt Lake City, Utah, a corporation of Utah Original application May 24, 1939, Serial No. 275,450. Divided and this application March 4, 1940, Serial No. 322,116

17 Claims. (Cl. 271—2.3)

This invention relates to improvements in dispensing cabinets for sheet material, and has among its objects to provide a simple stop mechanism which can be relatively cheaply manufactured, and which is rugged.

This application is divisional of our application Serial No. 275,450, filed May 24, 1939, and relates particularly to an improved stop mechanism and its assembly structure, as well as to an improved time-stop mechanism and its assembly structure.

One of the problems in certain stop mechanisms in which one of the stops is translatable is to obtain smooth, non-sticking motion, to eliminate noise, and to provide a construction which can be cheaply constructed and easily assembled.

The principal object of this invention is to provide a balanced mechanism which is substantially noiseless, which can be very easily assembled, which has but few parts, and which can be cheaply manufactured.

The stop mechanism herein has a timer of the vacuum-attached type, in which one of the vacuum-attaching elements is carried by a sliding element, which serves as one of the stops of the stop mechanism. In this type of device it is desirable to arrange the timer at the front of the cabinet so that the mechanism, including the means for adjusting the timing interval, is easily accessible.

Features of the invention include: The specific construction of the sliding portion of the stop mechanism, including its guiding means; the arrangement of the timer and its adjusting means forwardly at an accessible position near the front of the case or cabinet; the specific relation of the sliding means to the guides and to the means by which the act of dispensing controls the slide; the location of the pivot of the link in relation to the slide stop and to the axis of rotation of the movable stop; the use of spur gears by which the act of dispensing operates the stop mechanism; the construction of the rotatable stop as part of one of the gears of said spur gearing; the use of a spring for urging the slide against its guides and to prevent noise and to facilitate stop release; the use of a support for part of the timer as means for holding the slide in its guiding means; the arrangement of the guiding means so that the slide can be simply lifted out of its guides on release of a single element; and all details of construction along with the broader ideas of means inherent in the disclosure.

Objects, features and advantages of the invention will be pointed out in the description of the drawings forming a part of this invention; and In said drawings Fig. 1 is a vertical transverse section on line 1—1 of Figure 2, viewing the stop mechanism in its release position;

Figure 2 is a front view of the cabinet with its door closed, but broken away to show portions of the interior mechanism of the cabinet;

Figure 3 is a view taken on line 1—1 of Figure 2, but showing the stop in stop position as during timer action;

Figure 4 is a horizontal section through the slide and its guide mechanism, taken on line 4—4 of Figure 1; and Figure 5 is a horizontal section taken on line 5—5 of Figure 1 through the slide and one of its guides.

In the drawings, the numeral 1 indicates the back of the cabinet, and numeral 2 the bottom thereof. The bottom and back are formed in one piece, or section, as best shown in Figure 1. A forward portion of the bottom 2 is bent upwardly as at 6, so that its upper edge is arranged close to a feed roll 7 suitably journaled on an axis or shaft or trunnions 8 in a manner to be hereinafter described. This feed roll is grooved as at 9, and the upwardly, outwardly slanted portion 6 has attached thereunto suitable fingers 10 which cooperate with the groove to direct the paper downwardly and outwardly.

The upper edge of the back has an inturned or forwardly directed horizontal flange 15, which in turn has at its forward edge downwardly turned flanges 16 spaced apart to provide an opening 17. Below this cut out portion 17 and below the flange 15 is arranged a keeper 19 with which the hook 18 of a lock generally indicated at 19' engages to secure the cover. The locking mechanism is not described because it is of well known construction, but it will be understood when the key is inserted in the lock and the lock is rotated, the hook 18 is swung from locking position.

The front cover is substantially formed of three parts, one part of which forms the top 21 and the front 22, the other two parts forming the sides respectively indicated at 23, 24, all parts together forming a four-sided compartment. The hinging arrangement of this cover is a feature of the invention. The hinging means includes a pair of L-shaped brackets (only one of which has been shown) arranged one at each side of a pair of upright journaling plates later to be described, said brackets being indicated by numerals 25. Each bracket rests on the top of a flange of a corresponding feed roll journaling plate and each has an upturned outer portion through which passes a pivoting pin 26, one pin being attached to the side 23 and the other to the side 24. A split key 27 secures the pin 26 against outward movement. The pins are introduced into openings of the brackets from opposite sides by movement toward one another after the sides of the device have been preliminarily sprung outwardly. The straightening of the previously sprung sides 23, 24 tends to hold the pins in position.

The placement of these pins in relation to the inner and outer sections is such that when the cover is swung outwardly and downwardly to its lowermost position (while the inner section hangs on a wall, the outer edge of the knife portion 74 engages the bottom wall of the cabinet as a stop to limit rearward swing. In such a position the cover forms a receptacle for a temporary placement of the supply roll during servicing.

The tear-off knife is a downwardly, forwardly extending part of the bottom of the front wall 22 of the cover. This extension is indicated at 30 and it has paper-sighting openings 29 therein.

The feeding mechanism and the time-stop mechanism are mounted on a structure which includes two upright plates respectively indicated at 39, 40. Each plate (see Figure 1) has at each of three margins an outwardly directed flange, the flanges pointing toward the sides 23 and 24 of the cabinet. These elements 39, 40 are spaced to provide lateral chambers respectively indicated at 42, 43. The top flanges for the plates are respectively indicated at 44, 45 and these flanges are cross-connected by a bar 46 held by suitable screws 47. The rear flanges are indicated at 50 and the bottom flanges are indicated at 51. The bottom flanges 51 are spot welded to the bottom 2, as are the flanges 50 spot welded to the rear wall 1 of the cabinet. Key-hole slots 52 are provided in the rear wall so that the cabinet can be hung on suitable fastening devices (see Figure 1). This flanged and welded structure braces the perpendicularly related vertical and horizontal parts of the inner section and provides an unusually strong cabinet, by the use of a minimum amount of material.

As before stated, the feed roll is suitably journaled by means of a shaft 8, and the plates 39, 40 form part of the journaling means, the said shaft or equivalent trunnions passing through bearing collars punched out of the plates 39, 40. These plates also have slots 55 in which are journaled a presser roll 56 pressed into engagement with the feed roll 7, as best shown in Figure 1. Springs 58 suitably secured yieldably hold the roll in the position shown.

The supply roll has a diametric slot 60, and the plate 40 has a pin 62. The axial length of the supply roll is about equal to the distance between the plates 39 and 40, so that the roll cannot be put between the plates unless the slot is registered with the pin. The feature is covered in another application. It is understood that the supply roll, when properly placed, rests upon the measuring roll 7.

The presser roll 56 is cut out as at 65 to permit insertion of the paper by the tips of the fingers, to facilitate introduction of the paper into feeding relation between the rolls when servicing. This feature is covered in another application.

Attached at one end of the roll 7 between the plate 40 and the side 24 is a feed roll operating disk 70 which projects through slots 71, respectively, in the front 22 of the cover, and in a finishing plate 73. The plate is suitably secured by fastening devices and it has an outwardly, downwardly bent portion 74 which overlies the tear-off knife 30. It will be understood that this disk is used for starting the paper after tear-off, the paper after tear-off lying against the under side of the knife and being visible only through the sighting openings 29.

The main features of this invention relate to the stop mechanism structure and the assembly arrangement of its parts. Referring to Figure 1 which shows the stop mechanism in its normal or non-stop position. Figure 3 shows the stop mechanism in stop position. The only essential difference in the positions of these figures is the positions of the slide. In Figure 1 the slide is in its uppermost position with its cushion 96a engaging the flange 44, and in Figure 3 the slide is in its lowermost position with the vacuum cups in vacuum attached relation. It will be understood that when the mechanism is operated from its position in Figure 1 the slide is lowered even below the position shown in Figure 3 to primarily compress the cups, and then the resiliency of the cups moves the slide slightly to the position shown in Figure 3.

The axle or trunnion 8 of the feed roll 7 projects laterally through the plate 39 and has attached thereto a small spur gear 80. This gear meshes with a second larger gear 81 suitably journaled on a screw 82 carried by the plate 39. Suitably attached to the outer face of this gear 81 is a stop arm 83 which is adapted to engage the outer side of a stop flange 85, which is part of a slide 90. This flange is part of a channel-shaped element having an opposite flange 86 slidingly engaged with the flange 87 of a bracket 88 suitably secured to the outer side of a plate 39. The channel element is suitably secured to a slide element generally indicated at 90.

The slide structure and the manner of its assembly are features of this invention. The inner face of the slide lies against the outer face of the plate 39 and the inner upright edge 91 of the slide is engaged with another guide member 92 preferably struck out of the plate 39 and this element 92 and the flange or element 87 guide the slide on the inner side. It will be seen from the dot-and-dash line position of Figure 1 that as the arm 83 moves in counter-clockwise direction the slide is lowered. This is accomplished by means of a link later to be described, and in the dot-and-dash line position shown it will be noted that when the arm 83 moves in counter-clockwise direction, which it is now supposed to be doing, the principal thrust of the slide is against the element 87, while there is a tendency to rock the upper part of the slide to the right against a strike-out guide 93, which lies under a part of a timer-supporting bracket 94, suitably secured to the outer face of the plate 39. The bracket is arched to receive the guide 93, and the bracket 94 has a portion 95 overlying the upper part 96 of the slide 90, and the slide is held between this portion 95 and the outer surface of the plate 39.

Three guiding elements are thus provided for the slide, one adjacent its upper end, one near its bottom, both on the same side, and one near the middle on the opposite side. The first and last mentioned guides are struck up from the plate, the lowermost guide is detachably secured by bolts. In order to make room for the struck-out middle guide, the bracket is bowed outwardly, as shown, and this bowed portion merges into the attached portion of the bracket and into that portion which overlies the slide and prevents its outward movement from the upright 39.

The slide is moved to stop position and released for independent movement away from that position by means of a link 97, slotted as at 98. A pin 99 carried by the arm 83, passes through the slot and thus rotatably and translatably attaches the link to the gear 81. The opposite end of the link is pivoted to an outward extension 100 of the flange 85, and a split key 101 and a suitable washer secures the link in pivotal relation. The upper end of the link is attached to one end of a spring 102, the opposite end of which is attached to a struck-out portion of the flange 44, as best shown in Figure 1. This spring, it will be seen, acts through the link to raise the slide, as soon as it is released by the link, so that when the parts are positioned as in Figure 3 and the vacuum is released the link is free to slide upwardly under the action of the spring.

At the upper part of the slide is an extension 103 to which is attached a vacuum cup 104. The bracket or plate 94 has a shelf 105 upon the top of which is mounted another vacuum cup 106 which cooperates with the vacuum cup 104 in the manner to be described. This vacuum time-stop device is not herein claimed per se, inasmuch as it is covered in other pending applications. It will be understood that an intake opening 108 admits air within the cups so that the vacuum is gradually released, and the rate of air entry can be adjusted by means of a screw 109, yieldably held for adjustment by means of a spring 110 (see Figures 1, 2, 3 and 4) acting on the screw head 111.

It can be seen by an inspection of Figure 1 that the stop mechanism is, in this instance, arranged at a level above the feed roll, so that as the feed roll rotates the slide is pulled downwardly against the action of the spring 102. During downward action the link causes the flange 86 to be pressed against flange 87, the spring also acting at this time to press the slide rearwardly in the same direction against its two guides. Rocking tendency towards the right is prevented by the guide 93. When the slide moves upwardly from its position in Figure 3 by the action of the spring, the link now being loose and the slot sliding on the pin, the spring continues to keep the slide against both of its guides 87 and 92. This arrangement is claimed per se because it is a valuable and efficient arrangement of the parts not exactly like any other mechanism for the same purpose, known to us. The mechanism is particularly adapted for reducing noise, and for allowing an arrangement above the level of the feed roll, and for allowing an accessible positioning of the timer at the front so that adjustment can be easily accomplished. The three-guide arrangement, with the link and spring acting to hold the slide in anti-rattle relation to the two guides is a feature.

We claim:

1. A dispensing cabinet having dispensing means, having a first stop, a support, a slide forming a stop with which the first stop engages to limit the amount of dispensing, said slide having one face in sliding contact with the support, a single element opposed to the opposite face of the slide as the sole means to prevent movement away from the support, means acting on opposite edges of the slide to slidably guide it, a pair of members adapted to be brought into contact when the slide is in stopping position, one of said members being carried by the slide and the other member being supported by the single element which prevents movement of the slide away from the support.

2. A dispensing cabinet having dispensing means, having a first stop, a support, a plate forming a stop with which the first stop engages to limit the amount of dispensing, said plate having one face of greatest area in sliding contact with the support, a single element opposed to the opposite face of the plate as the sole means to prevent movement away from the support, three guides for the plate engaging opposite edges only of the plate, two guides only at one edge and one guide only at the opposite edge, a pair of members arranged laterally of the plate at that side which has the single guiding means and adapted to be brought into contact when the plate is in stopping position, one of the members being carried by the plate.

3. A dispensing cabinet having dispensing means, having a first stop, a sheet metal support, a plate forming a stop with which the first stop engages to limit the amount of dispensing, said plate having one face of greatest area in sliding contact with the support, a single element opposed to the opposite face of the plate as the sole means to prevent movement away from the support, three guides, two of which are struck out of the sheet metal support and the third of which is detachably secured to the support, said guides engaging opposite edges only of the plate, two only at one edge and one guide only at the opposite edge, a pair of members arranged laterally of the plate at that side which has one guide only and adapted to be brought into contact when the plate is in stopping position, one of the members being carried by said single element.

4. A dispensing cabinet having, dispensing means having a first stop, a support, a slide forming a second stop with which the first stop engages to limit the amount of dispensing, said slide having one face in sliding contact with the support, a single element opposed to the opposite face of the plate as the sole means to prevent movement away from the support, said element extending a substantial distance in the direction of slide motion, three guides for the plate engaging opposite edges only, two guides only for one edge, and one guide only for the opposite edge, said two guides respectively lying near opposite ends of said single plate element, and means by which the dispensing means operates the slide to move it to stop position and then release it for movement away from that position, including a crank toward and away from which said slide moves, a link pivoted at one end to the slide at a point in opposition to one of said two guides which is nearest the crank, said link having a slot sloosely traversed by a crank pin of said crank.

5. A dispensing cabinet having, dispensing means having a first stop, a support, a slide forming a second stop with which the first stop engages to limit the amount of dispensing, said slide having one face in sliding contact with the support, a single element opposed to the opposite face of the plate as the sole means to prevent movement away from the support, said element extending a substantial distance in the direction of slide motion, guides for the plate engaging opposite edge faces only, means by which the dispensing means operates the slide to move it to stop position and then release it for movement away from that position, including a gear toward and away from which said slide moves, a link pivoted by one end to and near one end of the slide and operated by a crank pin carried by the gear, and a second gear meshing with the first gear and operated by said dispensing means.

6. A dispensing cabinet having, dispensing means having a first stop, a support, a slide forming a stop with which the first stop engages to limit the amount of dispensing, said slide having one face in sliding contact with the support, a single element opposed to the opposite face of the plate as the sole means to prevent movement away from the support, said element extending a substantial distance in the direction of slide motion, guides for the plate engaging opposite edge faces only, means by which the dispensing means operates the slide to move it to stop position and then release it for movement away from that position, including a link extending generally in a direction lengthwise of the slide and pivoted by one end to and near one end of the slide, a pair of members arranged laterally of the slide and adapted to be brought into contact when the slide is in stopping position, one of the members being carried by the slide and the other member being supported by said single element.

7. A dispensing cabinet having, dispensing means having a first stop, a support, a plate forming a stop with which the first stop engages to limit the amount of dispensing, said plate having one face in sliding opposition with the support, means opposed to the opposite face of the plate functioning only for preventing movement of said plate away from the face of the support, means acting on opposite edges only of the plate to slidably guide it, said means being so disposed that on removal of said opposed means the plate is free for removal from its guide means by motion in a direction perpendicular to the face of the support, and means by which the dispensing means operates the plate to move it into stopping position and thereafter release it for independent movement away from said position.

8. A stop mechanism for controlling a dispensing means to limit the amount of dispensing, comprising a support having three guide elements having their guiding surfaces parallel with one another and substantially perpendicular to the face of the support, said guide elements being positionally related as the three angles of a triangle, a plate acting as a stop to limit dispensing movement of said dispensing means and having its inner face opposed to the face of the support, and having its edges only guidingly engaged by the guide elements, two of said guide elements engaging one edge of the plate and the third element engaging the opposite edge, means opposed to the outer face of the plate and functioning only to prevent movement of said plate away from the support and out of the guides, and means detachably securing said last mentioned means to the support.

9. A stop mechanism for controlling a dispensing means to limit the amount of dispensing, comprising a sheet metal support having three guide elements having their guiding surfaces parallel with one another and substantially perpendicular to the face of the support, said guide elements being positionally related as the three angles of a triangle, a plate acting as a stop to limit dispensing movement of said dispensing means and having its inner face opposed to the face of the support, and having its edges only guidingly engaged by the guide elements, two of said guide elements engaging one edge of the plate, and one of the two being struck out from the metal of the support, and the third element engaging the opposite edge of the support and being struck out from the metal thereof, means opposed to the outer face of the plate and functioning only to prevent movement of the plate away from the support and out of the guides, and means removably securing the element to the support.

10. A dispensing cabinet having dispensing means having a stop, a translatable slide with which said stop engages to limit the amount of dispensing, means for translatably guiding said slide, including a surface with which an inner face portion of the slide cooperates, a pair of spaced elements attached to said surface and with which one edge of the slide cooperates, a bracket detachably secured to said surface and having a portion overlapping the outer face of the slide for retaining said slide against motion in a direction away from said surface, a vacuum cup carried by the slide and a vacuum cup carried by the slide-retaining bracket, said cups constituting part of a timing mechanism which when vacuum attached hold the slide in a predetermined position.

11. A dispensing cabinet having dispensing means having a stop, a translatable slide with which said stop engages to limit the amount of dispensing, and means for translatably guiding said slide, including a surface with which an inner face portion of the slide cooperates, a pair of spaced elements attached to said surface and with which one edge of the slide cooperates, means detachably secured to said surface and overlapping the outer face of the slide for retaining said slide against motion in a direction away from said surface, a link and means by which the link is moved by the dispensing means and in turn moves the slide to bring the slide into the path of said stop during dispensing and thereafter releases the slide for independent motion away from such position, a spring, and means by which the spring is caused to act on the slide to move said slide away from the last mentioned position and simultaneously urge the edge of the slide against said spaced guide elements.

12. A dispensing cabinet having dispensing means having a stop, a translatable slide with which said stop engages to limit the amount of dispensing, means for translatably guiding said slide, a link and means by which the link is moved by the dispensing means and in turn moves the slide to bring the slide into the path of said stop during dispensing, and thereafter release the slide for independent motion away from such position, a spring, and means by which it acts on the slide to move said slide away from the last mentioned position, a first gear to which said stop is attached, a second gear meshing therewith and operatively connected with said dispensing means, the means by which the link is moved by the dispensing means, including a connection between the link and said first gear.

13. A dispensing apparatus having dispensing means having a first stop, a support, a second stop, means slidably mounting said second stop on the support to move into and out of engagement with the said first stop, including a plate as the sole means of preventing motion of said second stop away from said support in a direction perpendicular thereto, means detachably securing said plate, a timer including two members, one of which is carried by said plate and the other of which is carried by said second stop, said members being adapted to be engaged during movement of the second stop to stop position and when so engaged being adapted to hold said second stop in stop position.

14. A dispensing apparatus having dispensing means having a first stop, a support, a second stop, means slidably mounting said second stop on the support to move into and out of engagement with the said first stop, including a plate acting to prevent disengagement of the second stop from its mounting means, but permitting such disengagement only when said plate is removed, means detachably securing said plate, a timer including two members, one of which is carried by said plate and the other of which is carried by said second stop, said members being adapted to be engaged during movement of the second stop to stop position and when so engaged being adapted to hold said second stop in stop position, and means for holding said members immovably engaged for a time period, and means for causing the holding means to release the members at the end of a time period.

15. A dispensing apparatus having means which must move if dispensing is to occur, a stop mechanism for said means including a stop which slides to stop position to prevent operation of said first mentioned means, means slidably guiding said stop, a plate acting to prevent disengagement of said stop from said guiding means, means detachably securing the plate so that it can be removed to permit disengagement of the slide from its guiding means, a timer comprising a pair of members which are brought together to hold the stop in stop position to prevent dispensing operation of said first mentioned means, one of said members being carried by said plate and the other member being carried by said slide stop, and means for holding the members immovably engaged for a time period and then releasing said members at the end of such period.

16. A dispensing cabinet having, dispensing means having a first stop, a support, a plate forming a stop with which the first stop engages to limit the amount of dispensing, said plate having one face in sliding opposition with the support, means opposed to the opposite face of the plate functioning only for preventing movement of said plate away from the face of the support, means acting on opposite edges only of the plate to slidably guide it, said means being so disposed that on removal of said opposed means the plate is free for removal from its guide means by motion in a direction perpendicular to the face of the support.

17. A dispensing mechanism having a pair of stops which are engageable to prevent dispensing, a support, one of said stops being a slide which is backed by said support, a pair of guides on the support engaging one edge only of the slide, one of said guides being removably attached to said support, a third guide on the support engaging the opposite edge of the slide, means engaging the slide and functioning as the sole means for preventing motion of the slide away from the support and out of the guides, and means detachably securing the last mentioned means to said support.

FRANK G. STEINER.
RUDOLPH G. BIRR.